Patented Dec. 27, 1949

2,492,487

UNITED STATES PATENT OFFICE 2,492,487

QUINOLINE DERIVATIVE HAVING ANTI-MALARIAL PROPERTIES

Joseph B. Koepfli, San Marino, and Edwin R. Buchman, Pasadena, Calif., assignors to the United States of America as represented by the Secretary of War No Drawing. Application June 25, 1946, Serial No. 679,271

1 Claim. (Cl. 260—288)

The present invention relates to a new series of synthetic compounds and more particularly to a novel group of carbinols resembling quinine in structure and characterized by pronounced antimalarial activity.

In 1938 the synthesis of a compound (A) resembling quinine (B)

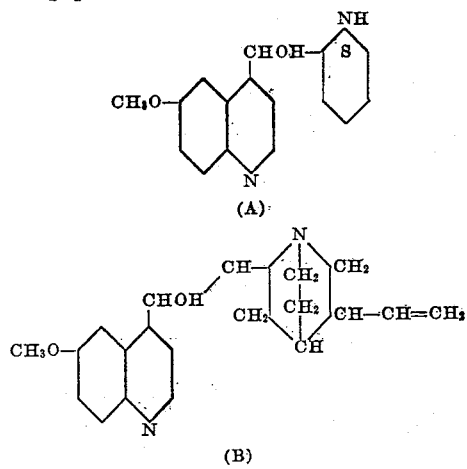

in structure and possessing activity against certain forms of avian malaria was announced by Ainley and King [Proc. Royal Soc. 125 B, 60 (1938)]. Although the activity of the compound (A) in bird malaria was only about one-fourth to one-third that of quinine itself, the announcement stimulated considerable interest inasmuch as it indicated that the alpha-quinuclidyl radical of the quinine molecule (B) could be substituted by a 2-piperidyl group, without completely destroying the antimalarial activity of the resulting compound against avian infections. Speculation along these general lines was further stimulated in 1940 when King and Work reported [Jour. Chem. Soc. 1307 (1940)] the preparation of (C)

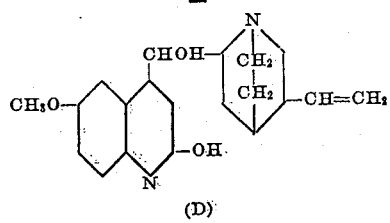

which had a dialkylaminomethyl group in place of the quinuclidyl ring of the quinine (B) molecule, and which was likewise active in avian malaria. As in the case of (A), the antimalarial activity of (C) in avian infections was also of a relatively low order (about one-third that of quinine); nevertheless both cases supported the working hypothesis that the 4-quinolylcarbinol group might be responsible for the antimalarial activity of quinine and related drugs. Furthermore both cases suggested the possibility that a readily synthesized quinine-like drug of high antimalarial activity might be produced by retaining the quinoline methanol portion of the quinine molecule and modifying either the basic side chain and/or the other nuclear substituents in the molecule.

The investigation which resulted in the present invention was originally suggested by the isolation of a crystalline degradation product (D) obtained by the in vitro action of rabbit liver on quinine, the compound (D) apparently resulting from the oxidation of the quinine molecule (B) at the 2-position of the quinoline ring. This suggested the speculative possibility (1) that the 2-position of the quinolyl group might have special significance in the biological reactions of quinine, other cinchona alkaloids and related compounds having anti-malarial properties; and (2) that the introduction of a group other than hydrogen in the 2-position of such compounds might possibly retard degradation of such drugs and perhaps prolong and/or enhance their antimalarial activity.

The speculative hypothesis mentioned in the preceding paragraph is admittedly based on fragmentary evidence and may or may not represent a valid generalization for all quinine-like drugs. Be that as it may, however, the hypothesis, while forming no part of this invention, nevertheless led to the discovery of certain fundamental principles upon which the present invention is predicated. One of these discoveries is that, in the general class of compounds containing the fundamental structural system or skeleton (E)

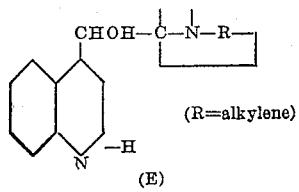

the substitution of an aryl group for the hydrogen atom shown in position 2 of the quinoline nucleus generally enhances the antimalarial activity of the resulting compound against avian infections to a substantial degree. A corollary to this principle is that the antimalarial activity of such 2-aryl-substituted-quinolyl carbinols of the type (E) may be still further enhanced by the presence of certain supplementary substituents in the other ring positions in the molecule.

Expressing these general principles from a slightly different point of view, the compounds with which the present invention is concerned, broadly stated, consist of a new series of synthetic carbinols which represent a sub-group of the class having the characteristic skeletal structure (E), the sub-group being characterized by at least one ring substituent in the quinoline nucleus, the characteristic substituent consisting or an aryl group located in the 2-position.

The antimalarial potency of such compounds depends on the nature of the aryl group in position 2, the nature of the alkylene group in the alkyleneimine side chain, and the number and nature of any supplementary substituents that may be present in the various ring systems of the molecule. In all cases investigated, however, the antimalarial activities of the compounds contemplated by the present invention, as determined against Plasmodium lophurae in the duck, are at least three or four times that of the most active Ainley-King compound (A) under similar test conditions, and in some instances are over one hundred times as active. Expressing these results in terms of quinine, the antimalarial activity of this new sub-group of carbinols, as determined against P. lophurae in the duck, ranges from approximately one to about forty times that of quinine itself, depending on the nature and number of the various substituents present in the molecule. It will thus be apparent that the compounds of the present invention are characterized by potent antimalarial activity.

The preferred carbinols in accordance with the present invention consist of 2-aryl substituted derivatives of (E) wherein the alkylene group consists of a 3 or 4 carbon atom chain. These preferred carbinols may therefore be represented as a sub-group of the parent class represented by the general formula (F)

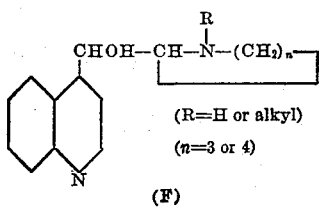

the sub-group being distinguished from the general class (F) by the presence of a ring substituent at least in the 2-position of the quinolyl group, the ring substituent occupying said 2-position consisting of an aryl radical. More specifically, the preferred compounds consist of quinine-like drugs having (1) a 2-piperidyl or 2-pyrrolidyl group substituted for the quinuclidyl radical of quinine; and (2) an aryl group in the 2-position of the quinoline ring, with or without other substituents attached to carbon and/or nitrogen in the various ring systems present in the molecule. It will thus be apparent that the compounds of the present invention represent a sub-class of carbinols of the type (E), having as an essential substituent an aryl group in the 2-position of the quinoline ring, with or without supplementary substituents in the other available positions of the quinoline ring and/or alkyleneimine ring of the molecule.

Before describing the synthesis of the various compounds contemplated by the present invention, it may be helpful to indicate in a general way the effect produced by various substituents on the anti-malarial activity of the parent class of compounds (E). This may be illustrated by indicating the approximate effect of typical substituents on a representative compound of the type (G)

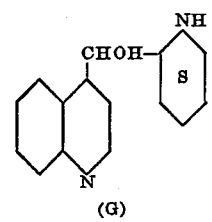

which, for convenience, may be referred to as the "naked" or "unsubstituted Ainley-King nucleus," and which may be regarded as the parent substance of the derivatives discussed below.

Considering, firstly, the effect of various 2-aryl substituents, on the basis of results obtained against P. lophurae in the duck, it has been found that the replacement of the 2-hydrogen atom of the quinoline ring in (G), by a phenyl group increases the activity of the compound from about eight one-hundredths that of quinine to roughly 1 to 3 times that of quinine, which corresponds roughly to a 10 to 30 fold enhancement in activity. If the 2-phenyl group in turn is replaced by a para-substituted phenyl group (e. g., p-halophenyl) the activity of the resulting compound may be still further increased by an additional factor amounting to at least 5 in the case of p-chlorophenyl. Generally speaking, the 2-aryl substituted compounds that may be regarded as being derived from the parent substance (G) will exhibit an activity against P. lophurae in the duck of at least 10 times that of the "naked nucleus" (G) and at least three or four times that of the most active compound (A) disclosed in the above mentioned Ainley-King article.

Turning now to the effect of the supplementary substituents, if, in addition to a 2-aryl substitution in the "naked nucleus" (G), one or more of the hydrogen atoms of, say, the benzenoid ring in the quinolyl group are replaced by various radicals (e. g., halogen, alkyl, alkoxy, aryl, benzo, etc.), the antimalarial activity of the resulting compounds may be still further enhanced. Thus, if the 8 hydrogen atom, or the 6 and 7, or the 6 and 8 hydrogen atoms are replaced by chlorine, the activity of the resulting compounds are usually enhanced by approximately seven-fold over that of the corresponding non-halogenated 2-aryl compounds.

Generally speaking, the effect of such supplementary substituents will depend at least partly on the nature, number and position of the supplementary groups. Thus the activity of the parent 2-aryl substituted carbinol may be further increased (as in the cases just mentioned); or it may be unaffected (as in the case of the 6 methyl derivatives, for example); or it may actually be decreased to some extent (as in the case of the 2-phenyl compound containing either the methoxyl group in position 6 of the quinoline nucleus, or a methyl or p-dialkylamino group in the benzene ring of the 2-phenyl group). However, in no case thus far investigated has the supplementary substituent destroyed the antimalarial activity of the parent 2-aryl substituted carbinol from which it may be regarded as being derived. Furthermore, it is conceivable that the supplementary substituent, even though in some cases apparently reducing the activity of the parent 2-aryl compound to some extent, may produce compensating effects of a desirable nature; for example, it may increase the solubility or the rate of absorption of the compound, or decrease its toxicity to the host. The supplementary substituents therefore provide a convenient means either for still further enhancing the antimalarial activity of the 2-aryl substituted carbinols, or for modifying the solubility, toxicity or other properties of the drug, or both.

In order more clearly to disclose the nature of the present invention, the preparation and properties of a number of specific embodiments will hereinafter be described in considerable detail. It should be clearly understood, however, that the details given below are purely illustrative of the principles involved and are not intended either to delineate the breadth of the invention or to limit the scope of the appended claim. In other words, the examples set forth below merely constitute representative, preferred embodiments of the invention.

*Method of preparation*

Turning now to the synthesis of the novel carbinols of the present invention, the method of preparation described in detail hereinafter may be represented by the following general scheme, in which Ar represents an aryl group; $n$ is either zero or unity; and X is a nuclear substituent such as halogen, alkyl, alkoxy or other group:

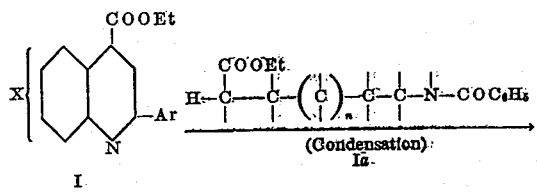

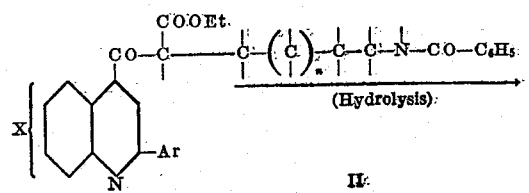

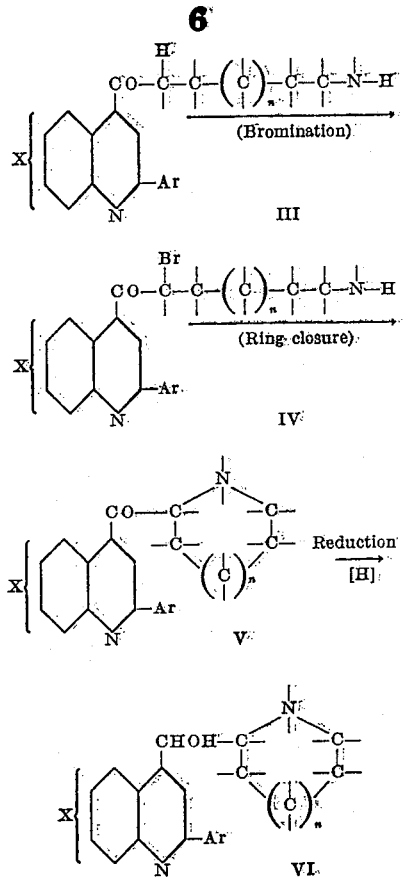

As previously indicated, in the above formulas, X represents any substituent or substituents attached to the quinoline ring which is compatible (does not interfere) with the course of the reactions; X may represent $CH_3$, Cl, $OCH_3$, $C_6H_5$, similar groupings or additional ring systems fused to the quinoline ring. Ar is, in general, any grouping which does not interfere with the synthesis; for example, phenyl, substituted phenyl, other aromatic nucleus, etc. The $n$ may be zero or one.

The various steps in the synthesis had previously been described by Ainley and King [Proc. Roy. Soc. B, 125, 49 (1938).] in the case of an example which did not contain the 2-substituent feature; this procedure has been reinvestigated by Sargent (unpublished work) who introduced important modifications. The general procedure used for preparing the 2-substituted carbinols of type (VI) is essentially the Ainley and King-Sargent method, modified as may be necessary to fit the individual cases.

In considering the appropriate variation to be employed, note that the 2-substituted carbinols forming the subject of this application are all of higher molecular weight (and the intermediates involved are presumably less soluble in various reagents) than the carbinols (and intermediates) prepared by Ainley and King.

In the following sections, a typical procedure will be outlined for the preparation of the preferred embodiments of the present invention. This procedure will illustrate the method generally outlined above.

*Condensation (I)→(II)*

For a typical run involving 0.75 mole of (I), sodamide is prepared in a 2-liter, 3-necked flask, fitted with stoppers, one of which carries an exit tube of 10-15 mm. in diameter to give free egress to the ammonia. About one liter of liquid ammonia is introduced and then 23.0 g. (1.0 mole) of sodium is added in small pieces. Anhydrous ferric chloride, 0.1 g., is added to catalyze the reaction. This is not specific since any anhydrous ferric salt may be used, even ferric oxide. The flask is wrapped with a towel and allowed to stand until the blue color is discharged, or the mixture assumes a muddy color. If the blue color persists after two hours, more catalyst may be added. When the reaction is complete, the flask is rotated in such a way as to rinse down as much as possible of the sodium which has spattered on the sides. The remainder of the ammonia is allowed to evaporate spontaneously or the process may be speeded up by mounting the flask as though it were the receiver in a vacuum distillation apparatus and directing a stream of water over the surface of the flask. The product is coarsely crushed with the flattened end of a stirring rod should be used immediately. If not used immediately, the contents of the flask must be protected with a soda-lime tube until needed.

The condensation is carried out in the flask in which the sodamide was made. A Hershberg stirrer is mounted in the center neck of the flask. A well made mercury seal is preferred; but to avoid any spattering of mercury into the flask, xylene may be used as the sealing liquid. A powerful stirring motor is required to avoid stoppage during the pasty stage of the condensation. A solution of 0.75 mole of (I) and of 0.75 mole of ethyl ε-benzamidocaproate (Ia) is prepared in the minimum quantity (about 350 ml.) of thiophene-free benzene and the solution distilled until the distillate is clear. When this drying operation is complete, the solution is cooled to room temperature and the volume brought up to that necessary with additional benzene to prevent crystallization of the solutes. The volume of solution should not be greater than 1 liter. If the volume is larger, a 3-liter flask should be used for the condensation. The solution of esters is added to the flask, and the stirrer started. The mixture is stirred for 15 minutes or until the sodamide is dispersed in a finely divided condition. An oil-bath is placed in position around the flask, and heated to 100° C. during the course of an hour, and held at this temperature for 24 to 36 hours. The mixture becomes pasty and then slowly becomes oily, at which stage the condensation may be considered complete.

In all of the cases under study, sodamide was used as the condensing agent, but other condensing agents such as sodium and sodium ethoxide are known to promote this type of reaction. In general, the ethyl ester of the cinchoninic acid was used but some other ester could be used perhaps equally well. Variations in the ester grouping and in the group attached to the nitrogen of (Ia) are also conceivable. Usually the two esters are used in equimolar, or nearly equimolar, amounts, but this ratio is not to be regarded as fixed. The sodamide is usually used in the ratio indicated but as high as 3 moles of sodamide per mole of (I) have been used with success. The increased amounts of sodamide do not consistently increase the yield and do increase the difficulty of stirring. If a higher proportion of sodamide is used, the pasty state in the condensation is very thick and the oily state is never reached, the mixture remaining as a thin paste.

Usually the dry solution of the ester mixture is added to the sodamide but the order of mixing may be varied; for instance, adding first (Ia) to sodamide and reacting the product with the cinchoninic ester has proved feasible in some cases. In general, carrying out the reaction at the boiling point of the solvent (benzene) has proved most satisfactory, but other similar diluents (toluene, etc.) may be used in place of benzene. The optimum time for completion of the reaction depends upon the physical characteristics of the reaction mixture and may vary from case to case.

*Hydrolysis (II) → (III)*

The reaction product from condensation of 0.75 mole of (I) is subjected to hydrolysis after stirring is stopped and the contents of the flask cooled to room temperature. An ice-cold solution of 500 g. of concentrated sulfuric acid in 500 g. of water is added. The stirrer is started and the flask heated over a Fisher burner. The mixture is brought to a boil, the flame is removed, the stirrer is removed, and the reflux condenser replaced with a take-off condenser. The mixture is distilled until the distillate contains benzoic acid. Benzene steam distills first, then ethyl benzoate, and, finally, benzoic acid. The volume of the mixture is maintained constant during the distillation by the addition of water. Heating is continued under reflux for up to 72 hours or until the mixture becomes homogeneous. A 5 ml. sample may be withdrawn from time to time to test for completeness of the hydrolysis; if, after subjecting the sample to the treatment described below, crystalline material is obtained, the hydrolysis may be considered complete.

The mixture is transferred to a 4-liter beaker and cooled in an ice-bath. Ice may be added to the mixture to hasten the cooling. An ice-cold solution of sodium hydroxide is added with cooling and stirring until the mixture is neutral (there is usually a color change). An additional amount of solution (equivalent to 2 moles) is added until the mixture is thoroughly basic; about 500 g. of U. S. P. sodium hydroxide is required. This amount may be used in any concentration up to 50% but 20 to 30% is preferred. The sodium salt of the cinchoninic acid usually separates at this point along with (III). The mixture is transferred to a 4-liter separatory funnel and extracted with 500 ml. of chloroform, and then with 300 ml. of chloroform; usually (III) is very soluble in this solvent. Any inter-face material is kept with the aqeous layer. This chloroform extraction may be modified if (III) separates as a solid. In this case, the solid material is allowed to settle and the supernatant liquid is decanted. The residue is washed into a separatory funnel with 500 ml. of chloroform and 1000 ml. of 5% sodium hydroxide and the extractions made as described. For recovery of cinchoninic acid, the aqueous layers are combined and acidified with glacial acetic acid.

The chloroform extracts are combined, and washed with 200 ml. of 5% sodium hydroxide solution, and twice with 200 ml. portions of water. The chloroform solution is dried over anhydrous sodium sulfate and filtered into a tared flask or beaker. The solvent is removed on a steam bath, and the weight of the residual oil determined. In many cases this crude (III) is of sufficient purity for direct isolation as the hydrobromide by addition of 48% hydrobromic acid; in case contamination with cinchoninic acid interferes with the crystallization of the hydrobromic acid salt, the following procedure may be followed. An amount of 5% acetic acid calculated to form a diacetate is added and the mixture heated to boiling. There is usually a residue which is best removed by adding Norite and filtering. The filtrate is cooled and made basic with a volume of 5% sodium hydroxide equal to that of the 5% acetic acid used. This insures the complete separation of (III) and provides an excess of base to retain any cinchoninic acid still present. The basic mixture is extracted with three 200 ml. portions of ether. Chloroform may be used but ether seems to have less tendency to take up any remaining cinchoninic acid. The ether extracts are combined, dried over anhydrous sodium sulfate, and filtered into a tared flask. The ether is removed on the steam bath and the weight of the oil determined. Sufficient 48% aqueous hydrobromic acid is added to form the dihydrobromide of (III). The mixture is heated gently until solution is complete, and equal volume of isopropyl alcohol is added, the mixture is heated to boiling, and allowed to cool. Usually, the product will crystallize and the mixture set to a thick paste. This is filtered and washed with isopropyl alcohol, then with a little ether. The filtrates may be concentrated in vacuo to yield small additional amounts of product. The yields of (III) as hydrobromide usually range from 20% to 50% based on (I).

Hydrolysis has always been effected by use of hot aqueous acid; experience has indicated that a strong acid is desirable (weaker organic acids give less satisfactory results due to incomplete hydrolysis at the temperatures employed). In the experiments to date, hydrolysis has been carried out in open vessel at the refluxing temperature of the solution; under these conditions the reaction velocity is limited by the solubility of the material to be hydrolyzed in the acid solution used at the temperature of refluxing. Undoubtedly the higher temperatures which could be attained in pressure equipment would make it possible to speed up this step. Aqueous hydrochloric acid may be used in place of sulfuric acid and its use may be preferable with low molecular weight compounds; the use of hydrobromic acid, etc., is not excluded.

The choice of solvent for extraction of (III) is not limited to chloroform; methylene chloride, ether, etc., may be used. (III) may be isolated in some cases as a solid [analyzing for (III) minus 1H₂O] and the material used directly for the next step by dissolving in 48% hydrobromic acid and brominating. Recovery of the cinchoninic acid is advisable; as a rule, recovery is high when the yield of product on the condensation step is low. (III) may be obtained as the hydrobromide from crude base plus aqueous hydrobromic acid as above; the salt may be crystallized from aqueous hydrobromic acid with or without the addition of other solvents as isopropanol, acetone, etc. The amount of hydrobromic acid used and its concentration may be varied from case to case to meet the individual requirements as to solubility of the salt, combining power of the base, etc.

Bromination→(IV)

The hydrobromide of (III) is tested for solubility in aqueous hydrobromic acid; the solubility may vary within wide limits. In the general case, the salt is dissolved in the minimum amount of 15-48% aqueous hydrobromic acid at the boiling point. Often the salt dissolves leaving a tarry residue; no attempt should be made to bring this tar into solution. It is best to make the solution in an Erlenmeyer flask, cool slightly, decant into the stirrer equipped flask used for the bromination, and reheat to the boiling point. To this solution in the course of 10 to 20 minutes, is added 95% of the calculated amount of bromine which has been dissolved in an equal volume of 48% hydrobromic acid. If the addition is too rapid an oily perbromide may separate. If this occurs, the addition of bromine is stopped, and the mixture is heated under reflux until the oil dissolves. Sometimes the addition of a few drops of 48% hydrobromic acid will aid in the solution of the oil. In certain cases the product, (IV), may begin to crystallize before the addition of the bromine is complete. This offers little difficulty; if desired, the mixture may be reheated to the boiling point and enough hydrobromic acid cautiously added to bring about complete solution. In any case the bromination is completed and the mixture allowed to cool. If the product crystallizes nicely, it is filtered and washed with a small amount of acetone, or similar solvent, followed by large quantities of ether (the reduction seems to be slow unless the acetone is removed). The filtrates may be concentrated under vacuo, and a volume of isopropyl alcohol equal to that of the solution added to yield a second fraction of (IV) hydrobromide. The yield is usually 70 to 90% based on (III).

If the product oils out on cooling, the mixture is cooled rapidly to 0° C. with an ice bath, the supernatant liquid decanted, and worked up for the second fraction. The oily residue is dissolved in the minimum amount of hot isopropyl alcohol and allowed to cool. This usually induces crystallization. The product is filtered and washed with ether. The filtrates may be concentrated to yield additional product. If recrystallization is necessary, 48% hydrobromic acid, methyl, ethyl, or isopropyl alcohols, alone or in conjunction with hydrobromic acid, have been found to be the best solvents. In a specific case, tests should be made before selecting the solvent to use.

It is understood that conditions attending the bromination time, temperature and other factors may be varied to suit the needs of the case. The product (IV) has always been isolated as the hydrobromide; methods for isolation and purification are those given above or some simple variant.

Ring closure and reduction (IV)→(V)→(VI)

(IV) hydrobromide (0.1 mole) is added to 1500 ml. of absolute ethanol and placed in a bottle of about 2.5 l. capacity. While sweeping the air out of the bottle with a stream of nitrogen, 230 ml. of freshly boiled and cooled aqueous 14% solution of sodium carbonate (0.3 mole) is added with shaking. It is convenient to supply the nitrogen through the hydrogen manifold of the hydrogenation apparatus. The bottle is stoppered and put on the shaking machine for one hour.

Adam's platinum oxide catalyst, 3.0 g., is added and the mixture reduced with hydrogen at atmospheric pressure. The reduction may require several hours and is continued until the hydrogen uptake practically ceases. The amount required is usually 5 to 10% greater than that calculated. If less than this amount is absorbed, additional catalyst may be added, taking care to observe the usual precautions.

At the end of the reduction, the catalyst is recovered by filtration and the filtrate distilled or evaporated to remove the alcohol. The filter cake is either rinsed with alcohol and the filtrates combined, or rinsed with water to remove inorganic salts and then with alcohol. In any case, the catalyst is finally recovered and stored under absolute alcohol for future use.

The filtrate, when the alcohol has been removed, is diluted with 100 to 200 ml. of water and extracted with two 100 ml. portions of chloroform. The chloroform extracts are combined, dried over anhydrous sodium sulfate or potassium carbonate, filtered, and evaporated on a steam bath. The residue, freed from chloroform, is taken up in the minimum amount of 95% ethanol at the boiling point and dry hydrogen chloride is passed into the solution in excess. The product usually separates as a crystalline mono- or di-hydrochloride; yield from (IV) hydrobromide may vary in the range 30%–95%.

Conditions attending ring closure may be altered in a suitable manner; for instance, the cyclization in a two phase ether-water system according to Ainley and King may be employed but its use is not generally recommended. Working in a nitrogen atmosphere is not essential; other alcohols than ethanol have been used as solvent for the ring closure reaction; in a few cases anhydrous solid potassium carbonate has been added to the reaction mixture in addition to the aqueous sodium carbonate; the use of a strong base such as sodium hydroxide has not proved valuable.

Adam's catalyst has been used in all cases for the reduction step but some other catalyst could probably be used equally well; other conditions on this step might also be varied. In some cases, the overall yield from (IV) to (VI) is low and the amount of byproducts formed rise correspondingly. These byproducts are usually more soluble in nature than (VI) and the desired carbinol can be isolated as a salt or as the free base making use of this generalization. Chloroform is in most cases a suitable solvent for (VI) but other solvents have been employed. The salts of (VI) have usually been made in ethanol solution; in addition to the hydrochlorides, hydrobromides, sulfates and salts with organic acids have been found to be useful. It happens that (VI) may form more than one series of fairly stable salts; in cases where both mono- and di-hydrochloride are known, the di-hydrochloride may be colored and the monohydrochloride colorless. The salts are often solvated (especially hydrated) and the degree of solvation may depend upon crystallization conditions; salts may frequently be recrystallized from ethanol (or aqueous ethanol) containing a small amount of the corresponding free acid. In general, it is somewhat more easy to isolate and to crystallize (VI) salts than (VI) free base. (VI) is sometimes isolated directly and may also be regenerated from the salt in a suitable manner; alcohols, benzene, other solvents or solvent pairs have been used for recrystallization; from benzene (VI) is obtained solvent-free, but from alcohols it has often been observed to crystallize with a solvent molecule which may be tightly held.

In the preparation of carbinols (VI) containing an alpha pyrrolidyl group for example there may be used a suitable analog of ethyl ε-benzamidocaproate; otherwise the steps from (I) to (VI) are carried out by methods closely approximating those used for the preparation of the 2-piperidyl compounds. In place of (Ia) which is a derivative of ε-aminocaproic acid, other derivatives of ε-aminocaproic acid may be used or there may be used derivatives of δ-aminovaleric acid. The synthesis has been carried through successfully with ethyl δ-benzamidovalerate and with ethyl (N-benzoylpiperidyl-4)-acetate, and the presumption is that a wide variety of related esters could be used.

Having described in considerable detail a general method of preparing the compounds of the present invention, a number of specific examples which further illustrate the principles involved will now be described. In these examples, in order to avoid unnecessary repetition, only those procedural details which differ from the general procedure described above will be mentioned. The Roman numerals used are those employed in the general scheme outlined in the preceding paragraphs.

EXAMPLE 1

*(2-phenylquinolyl-4)-α-piperidylcarbinol (SN 8538)*

360 g. of ethyl 2-phenylcinchoninate and 345 g. of (Ia) were heated with sodamide from 38 g. of sodium in 675 ml. of benzene for 22 hours at 90° C. The product was refluxed for 40 hours with 1200 ml. of concentrated hydrochloric acid in 1-liter of water. (III) extracted with 750 g. of 40% hydrobromic acid, and brominated by adding 138 g. of bromine in 275 ml. of 40% hydrobromic acid at 85° C. Cooling gave yellow needles, 334.5 g., M. P. 210° C. (dec.). A sample was recrystallized from methanol-i-propyl ether; M. P. 197° C. (dec.); analysis for B·2HBr.

140 g. of (IV), 2200 ml. of ethanol, and 735 ml. of 15% sodium carbonate were shaken for 50 min. and reduced after addition of 3 g. of catalyst (4 hours). Precipitation of (VI) as the dihydrochloride from ethanol gave 71 g., M. P. 225° C. (dec.). Recrystallization from dilute hydrochloric acid-acetone gave colorless prisms, M. P. 227.5° C. (dec.), of B·2HCl·H$_2$O. The free base, from i-propyl ether, was colorless needles or flat prisms, M. P. 144° C., unsolvated; from methanol, colorless needles were obtained with 1 molecule of methanol, M. P. 93–96° C.

EXAMPLE 2

*(6-methoxy-2-phenylquinolyl-4)-α-piperidylcarbinol (SN 9849)*

276 g. of ethyl-2-phenylquininate and 237 g. of (Ia) were heated with sodamide from 2 g. of sodium in 500 ml. of benzene for 25 hours at 90° C. The product was refluxed for 40 hours with 700 ml. of concentrated hydrochloric acid in 500 ml. of water. (III), extracted with 760 g. of 40% hydrobromic acid, was brominated by adding 64.5 g. of bromine in 130 ml. of the same solvent at 85° C. Cooling gave 101 g. of a yellow powder, M. P. 171° C. (dec.), and recrystallization from a mixture of methanol and i-propyl ether gave yellow needles, M. P. 175° C. (dec.), analysis for B·2HBr·2H$_2$O.

104 g. of (IV), 1750 ml. of ethanol, and 490 ml. of 15% sodium carbonate were shaken for 50 minutes and reduced after adding 2.5 g. of catalyst (3 hours). Precipitation of (VI) as the dihydrochloride from ethanol gave 49 g. of yellow solid, M. P. 237° C. (dec.). The free base, from i-propanol, was feathery needles, M. P. 176° C., unsolvated. From methanol, colorless prisms, losing solvent at 90–107° C., resolidifying, and melting at 177° C., analysis for B·CH$_3$OH. The dihydrochloride, obtained by precipitation of the pure base, crystallized as B·2HCl·½H$_2$O.

EXAMPLE 3

(6-chloro-2-phenylquinolyl-4)-α-piperidyl-carbinol (SN 9848)

238.8 g. of 6-chloro-2-phenylcinchoninic ester (M. P. 81° C., prepared from 5-chloroisatin plus acetophenone and esterification of the resulting acid, M. P. 238° C.) plus 204 g. of (Ia) in 400 ml. of benzene plus sodamide from 21.8 g. of sodium was heated for 19 hours at about 90° C. Hydrolysis with refluxing 6 N hydrochloric acid was not complete in 96 hours and was carried to completion by additional 96 hours, refluxing after addition of concentrated sulfuric acid. Crude (III) was treated with 180 g. of 48% hydrobromic acid, yield of salt 133.5 g. This was dissolved in 400 ml. of 48% hydrobromic acid plus 950 ml. of water, heated and brominated with 44.6 g. of bromine in 48% hydrobromic acid. (IV) hydrobromide was obtained, yellow needles, yield 104.3 g. (22.4% from (I)), recrystallized from methanol-48% hydrobromic acid, M. P. 206° C. dec., analysis for B·2HBr·H₂O. 103 g. of (IV) hydrobromide in 3070 ml. of ethanol was shaken for ½ hour with 410 ml. of 14% sodium carbonate solution and reduced after addition of 1 g. of catalyst (6 hours). (VI) was isolated as the free base, yield 35 g. of colorless rhombs (49%), M. P. 190° C. from methanol-water, analysis for B·CH₃OH. The hydrochloride was obtained as colorless needles, M. P. 234° C. from ethanol-water, analysis for B·HCl.

EXAMPLE 4

(6-chloro-2-phenylquinolyl-4)-α-N-methyl-piperidylcarbinol (SN 11370)

Methylation of (6-chloro-2-phenyl-4)-α-piperidyl-carbinol with dimethyl sulfate in the presence of potassium carbonate gave the N-methyl derivative which was isolated as the hydrochloride, rectangular plates from ethanol-water, M. P. 215° C., dec., analysis for B·2HCl·1.5H₂O.

EXAMPLE 5

(6-methyl-2-phenylquinolyl-4)-α-piperidyl-carbinol (SN 9875)

Sodamide from 11.4 g. of sodium plus 105.8 g. of (Ia) and 116.8 g. of ethyl 6-methyl-2-phenyl-cinchoninate in 240 ml. of benzene gave a product which was hydrolyzed by refluxing for 54 hours with 300 ml. of water and 210 ml. of concentrated sulfuric acid. The crude (III) was treated with 150 g. of 48% hydrobromic acid, yielding 96.3 g. (48.3%) of (III) hydrobromide, a portion of which recrystallized from ethanol-water in yellow bars, M. P. 244° C., dec., analysis for B·2HBr. 77.3 g. of (III) hydrobromide in hot dilute hydrobromic acid was brominated by the rapid addition of 24.9 g. of bromine dissolved in hydrobromic acid. The product was recrystallized from ethanol-water, yield 64.3 g. (67.8%) light yellow needle clusters, M. P. 188° C., analysis for B·2HBr·2H₂O. 60.3 g. of (IV) hydrobromide was shaken for 1 hour together with 1600 ml. of ethanol and 246 ml. of 14% sodium carbonate solution. Hydrogenation after addition of 0.75 g. of platinum oxide required 2 hours. The product was filtered, washed with ethanol, taken up in chloroform, the chloroform replaced by ethanol and (VI) hydrochloride precipitated by saturating the solution with dry hydrogen chloride, yield 29.3 g. (two crops) (69.6%). The salt recrystallized from ethanol-water in clusters of small colorless needles, M. P. 233° C., dec., analysis for B·2HCl·H₂O.

The free base crystallized from acetonitrile in hexagonal plates, M. P. 182.5° C.

EXAMPLE 6

(7-chloro-2-phenylquinolyl-4)-α-piperidylcarbinol (SN 10286)

Sodamide from 12.5 g. of sodium plus 118 g. of (Ia) and 134 g. of ethyl 7-chloro-2-phenylcinchoninate in 250 ml. of benzene gave after 18 hours of condensation a product which was hydrolysed by refluxing for 48 hours with 330 ml. of water and 245 ml. of concentrated sulfuric acid. 99.4 g. (34%) of (III) was isolated by crystallization from 40% hydrobromic acid, employing the procedure of neutralization of the hydrolysis mixture, extraction with CHCl₃, and addition of the hydrobromic acid. After several recrystallizations from methanol a sample melted at 260–265° C. (dec.) and analyzed for B·2HBr. 96.6 g. of (III) dihydrobromide was suspended in 1 liter of 48% hot hydrobromic acid and brominated by the addition of a solution of 30 g. of bromine in hydrobromic acid. The product was 101.0 g. (91%) of yellow crystals melting at 260–263° C. It analyzed for B·2HBr. 97.2 g. of (IV) dihydrobromide was shaken for one hour with 1 liter of ethanol and 420 ml. of saturated sodium carbonate solution. After addition of 2.3 g. of platinum oxide hydrogenation required 10 hours. The catalyst and inorganic salts were removed by filtration, the residue washed with ethanol, and the filtrate and washings concentrated in vacuo. The residual oily layer was taken up in chloroform, filtered, dried, and the chloroform removed. Solution in 100 ml. of absolute ethanol and addition of 200 ml. of 6 N ethanolic HCl precipitated 27.7 g. (40%) of carbinol dihydrochloride, M. P. 219–220° C. The material was purified by crystallization from a mixture of methanol and isopropyl ether. It analyzed for B·2HCl. The free base melted at 189–191° C. after crystallization from methanol, and analyzed correctly.

EXAMPLE 7

(8-chloro-2-phenylquinolyl-4)-α-piperidylcarbinol (SN 10281)

Three-tenths mole each of (Ia) and of ethyl 8-chloro-2-phenylcinchoninate in 180 ml. of benzene were added to sodamide from 0.37 mole of sodium and the mixture heated for 21 hours at about 86° C. The product was refluxed for 50 hours with 156 ml. of concentrated sulfuric acid in 224 ml. of water. Crude (III), 73.4 g., with 70 g. of 48% hydrobromic acid gave (III) hydrobromide (47.9 g.) which was contaminated with (I); it was taken up in 48% hydrobromic acid and brominated. The product was recrystallized from ethanol, bright yellow needles, yield 50.5 g. (28.3%), M. P. ca. 171° C. from ethanol-48% hydrobromic acid, analysis for B·HBr·3.5H₂O. 39.6 g. of (IV) hydrobromide was shaken for one hour with 1 liter of ethanol and 155 ml. of 14% aqueous sodium carbonate solution; 0.75 g. of catalyst was added and the mixture hydrogenated (71 minutes). 300 ml. of butanone was added, the mixture filtered hot and the filtrate evaporated. Washing the residue with water and chloroform gave 11.6 g. of (VI), compact colorless clusters, M. P. 218° C. from pyridine (analysis for C₂₁H₂₁ClN₂O. The chloroform phase was freed of solvent, taken up in alcohol and saturated with hydrogen chloride gas, yielding 7.4 g. of (VI) hydrochloride, transparent bars from ethanol-water, M. P. 232° C. dec., analysis for B·HCl (total yield of (VI) from (IV) 87.4%, overall yield from (I) 24.7%).

EXAMPLE 8

*(8-methyl-2-phenylquinolyl-4)-α-piperidylcarbinol (SN 12238)*

116.8 g. of ethyl 8-methyl-2-phenylcinchoninate (M. P. 71.5° C.) and 105.8 g. of (Ia) were heated with sodamide from 11.4 g. of sodium in 240 ml. of benzene for 20 hours at about 100° C. The product was refluxed for about 43 hours with 210 ml. of concentrated sulfuric acid in 300 ml. of water. Crude (III), 98 g., was treated with 40 g. of 48% hydrobromic acid, and the mixture diluted with acetone. A first crop of 14.7 g. was obtained, a portion of which was recrystallized from glacial acetic acid, light yellow, thin, rectangular blades, M. P. 136° C., analysis for B·2HBr·2H2O. Dilution of the mother liquors with ether gave two additional crops, totaling 49.9 g., M. P. about 157° C.; this material crystallized from glacial acetic acid in clusters of light tan needles, M. P. 178° C., analysis for B·HBr (total yield of (III) hydrobromides about 35%). 38.4 g. of (III) monohydrobromide in 93 ml. of hot 48% hydrobromic acid was brominated with 14.9 g. of bromine in the same solvent. Addition of isopropanol to the reaction mixture and cooling gave clusters of tiny, pale yellow needles, yield 51.5 g., M. P. ca. 156° C. (bromination of (III) dihydrobromide gave the same product); a portion recrystallized from isopropanol-water in clusters of long, shiny yellow needles, M. P. 176° C., analysis for B·HBr·0.5H2O. 56.1 g. of (IV) hydrobromide plus 1480 ml. of ethanol plus 227 ml. of 14% aqueous sodium carbonate were shaken for 80 minutes and reduced after addition of 0.75 g. of catalyst (ca. 3 hours). The reaction mixture was filtered, washed with benzene, evaporated, and the crystalline residue washed with water, yield 26.6 g. (ca. 84% from (III) hydrobromide). (VI) crystallized from acetonitrile-pyridine in needle clusters, M. P. 188° C. 26.2 g. of (VI) was converted to the hydrochloride by dissolving in hot ethanol and treating with one equivalent of 6 N hydrochloric acid, yield 25.7 g. of tiny white needles; a portion was recrystallized from ethanol-water, clusters of colorless bars, M. P. 247° C., dec., analysis for B·HCl.

EXAMPLE 9

*(2,8-diphenylquinolyl-4)-α-piperidylcarbinol (SN 12239)*

145.7 g. of ethyl 2,8-diphenylcinchoninate (needles, M. P. 105° C., from the acid, M. P. 243° C., prepared from o-aminobiphenyl, pyruvic acid, and benzaldehyde) and 108.7 g. of (Ia) were stirred with sodamide from 11.9 g. of sodium for 40 hours at about 90° C. Crude (II) was refluxed with 214 ml. of concentrated sulfuric acid in 308 ml. of water for 17 hours. Crude (III), 143.4 g., plus 62 g. of 48% hydrobromic acid was diluted with acetone, yielding after reworking the mother liquors, 98.7 g. (43%) of (III) hydrobromide; after recrystallization from warm glacial acetic acid-acetone, it melted at 224° C. (prior sintering), analysis for B·2HBr. 81.4 g. of (III) hydrobromide in 172 ml. of hot 48% hydrobromic acid was treated with a solution of 27.4 g. of bromine. After removal of some tar, the salt was crystallized by addition of about 250 ml. of hot ethanol, yield (four crops) 84.7 g. of fine, bright yellow needles, M. P. 177° C. from glacial acetic acid, analysis for B·HBr·1.5H2O. 63.7 g. of crude (IV) hydrobromide, 1500 ml. of absolute ethanol and 214 ml. of 14% aqueous sodium carbonate were shaken for 90 minutes, 0.75 g. of catalyst added and the mixture reduced (hydrogen uptake slow, additional 0.7 g. of catalyst added) during 30 hours. The product was filtered hot, washed with alcohol, the filtrates evaporated and the residue taken up in benzene. (VI) was extracted with 6 N hydrochloric acid, liberated, again taken up in benzene and recrystallized from ethanol-benzene, yield (two crops) 20.2 g. (47.5%), clusters of fine white needles, M. P. 196° C., analysis for C27H26N2O. 20.1 g. of base in 100 ml. of hot 6 N hydrochloric acid was diluted with 650 ml. of acetone followed by 100 ml. of water; on cooling, colorless bars crystallized; yield of (VI) hydrochloride 20.8 g. (four crops). The salt was recrystallized from ethanol-6 N hydrochloride acid, M. P. 242° C., analysis for B·HCl.

EXAMPLE 10

*(6,7-dichloro-2-phenylquinolyl-4)-α-piperidylcarbinol (SN 12282)*

70 g. of ethyl 6,7-dichloro-2-phenylcinchoninate and 57 g. of (Ia) were heated with sodamide from 9 g. of sodium in 125 ml. of benzene for 22 hours at 100–110° C. The product was refluxed for 90 hours with 150 ml. of concentrated sulfuric acid in 300 ml. of water. The mixture was diluted with 1250 ml. of water, heated to the boiling point, and suction filtered. The insoluble residue was re-extracted with eight 500 ml. portions of boiling 10 vol. per cent sulfuric acid, and the combined aqeuous extracts were worked up by alkalinization with 50% sodium hydroxide and extraction with chloroform to give a dark brown oil (37 g.). To this, 40 ml. of 40% hydrobromic acid and 120 ml. of acetone were added and the oil was brought into solution by warming. Evaporation to dryness and crystallization of the residue from 96% ethanol gave 31 g. of B·HBr·H2O, M. P. 162–174° C. 18 g. of (III) was brominated in 130 ml. of 48% hydrobromic acid with 6 g. of bromine in 12 ml. of 48% hydrobromic acid, added dropwise at the boiling point. The product was extremely insoluble, making this operation difficult. 21 g. of (IV) was isolated as B·2HBr, M. P. 228° C. (dec.).

18.5 g. of (IV), 370 ml. of water, 740 ml. of ether, and 220 ml. of 15% sodium carbonate were shaken for 50 minutes. The ether phase was separated, dried with sodium sulfate, evaporated to dryness, and the residue was taken up in 200 ml. of ethanol and reduced with 0.7 g. of catalyst 2½ hours). (VI) was isolated as the dihydrochloride from ethanol, 2.3 g., M. P. 227° C. (dec.). This was converted to the free base (1.5 g.), flat prisms from ethanol, M. P. 202–206° C., after loss of solvent and resolidification. Recrystallization from ethanol gave colorless prisms, M. P. 204–206° C., analysis for B·C2H5OH. The dihydrochloride was obtained from ethanol by precipitation as yellow needles, M. P. 230° C. (dec.), analysis for B·2HCl.

EXAMPLE 11

*(6,8-dichloro-2-phenylquinolyl-4)-α-piperidylcarbinol (SN 10275)*

A solution of 170.4 g. of ethyl, 6,8-dichloro-2-phenylcinchoninate (needles, M. P. 132° C., from the acid, M. P. 266° C., which in turn was made from 5,7-dichloroisatin and acetophenone) and 141.2 g. of (Ia) in 300 ml. of benzene was heated with sodamide from 15.2 g. of sodium for 16 hours at about 95° C. The product was refluxed for 48 hours with 400 ml. of water and 360 ml. of concentrated sulfuric acid. Crude (III) was treated with an equivalent of 40% hydrobromic acid plus an equal volume of isopropyl alcohol; the salt formed pearly yellow flakes, yield 103 g., analysis for B·HBr. 82.5 g. of (III) hydrobromide in 180 ml. of 48% hydrobromic acid was rapidly brominated at 80° C. with a solution of 28.2 g. of bromine; the bromination mixture was heated to boiling and then cooled. The product was not obtained crystalline; it was dispersed in 3 l. of absolute alcohol and treated with 6 N sodium hydroxide solution (approximately 350 ml.) with cooling until the color just changed from yellow to red. 200 g. of anhydrous sodium carbonate powder was then added and the mixture shaken for 1¾ hours and reduced after 3 g. of catalyst had been added. The product was filtered, washed with 1.5 l. of hot benzene-butanone and the filtrate evaporated. From the residue, crude crystalline (VI) was isolated and converted to the monohydrochloride, yield 21.0 g., colorless plates, M. P. 273° C. Two hydrated monohydrochlorides have also been prepared, the hemihydrate, hexagons, M. P. 250° C., and the sesquihydrate, M. P. 249° C. (dec.); the free base crystallized from isopropanol in needles, M. P. 228° C.

EXAMPLE 12

2 - phenylbenzo[h]quinolyl-4-α-piperidylcarbinol (SN 10534)

201 g. of ethyl 2-(phenylbenzo[h]quinolyl-4-carboxylate, M. P. 96° C., 161 g. of (Ia) in 370 ml. of benzene and sodamide from 17.7 g. of sodium were condensed for 28 hours at about 96° C. The product was hydrolyzed with 319 ml. of concentrated sulfuric acid in 457 ml. of water by refluxing for 37 hours. Crude (III) (160.5 g.) plus 71 g. of 48% hydrobromic acid plus about 250 ml. of isopropanol gave 119.2 g. (43.2%) of salt, a portion of which was crystallized from glacial acetic acid, clusters of yellow-brown needles, M. P. 206° C., analysis for (III) ·HBr. 94.3 g. of (III) hydrobromide in 105 ml. of warm 48% hydrobromic acid was treated rapidly with 33.6 g. of bromine in 27 ml. of the same solvent. After heating to complete the reaction, 275 ml. of 48% hydrobromic acid, 500 ml. of isopropanol, 800 ml. of ethanol, and 300 ml. of water were added and the mixture reheated to dissolve the crystalline product. On cooling, orange-yellow needles were obtained, yield 99.6 g. (83.9%), M. P. 196° C. (dec.), analysis for B·HBr·2H2O. 60.9 g. of (IV) hydrobromide, 1500 ml. of ethanol, and 232 ml. of 14% aqueous sodium carbonate were shaken for 80 minutes; 0.75 g. of catalyst was added and the pasty suspension shaken with hydrogen for 25 hours. 300 ml. of butanone and 450 ml. of benzene were added, the mixture filtered hot and the filtrate evaporated. Crude (VI) was taken up in chloroform, solvent removed and the residue taken up in 95% ethanol and saturated with anhydrous hydrogen chloride. The crude (VI) hydrochloride was recrystallized from 100 ml. of water and 190 ml. of 12 N hydrochloric acid, large, well-formed, yellow- brown needles, yield 49.6 g. (97.7%), M. P. 258° C. (dec.), analysis for B·2HCl·1.5H2O. The free base was obtained in minute white needles from pyridine, M. P. 227° C., analysis for $C_{25}H_{24}N_2O$

EXAMPLE 13

2-(p-chlorophenyl)-quinolyl - 4 - α-piperidylcarbinol (SN 10000)

Sodamide (0.75 mole) together with a solution of 0.5 mole each of ethyl 2-(p-chlorophenyl)-cinchoninate (M. P. 88° C. from esterification of the corresponding acid) and of (Ia) in 270 ml. of benzene was stirred for 26 hours at 90-95° C. Hydrolysis was accomplished by refluxing for 60 hours with 750 ml. of 50% sulfuric acid. Crude (III) was treated with 0.25 mole of 48% hydrobromic acid, yield of salt 66 g. (mixture of mono- and di-hydrobromide; 29% yield). 65 g. of (III) hydrobromide in 250 ml. of boiling 15% hydrobromic acid was brominated with 21.7 g. of bromine in 50 ml. of 48% hydrobromic acid during 15 minutes, yield 78 g. (96%). 42 g. of (IV) hydrobromide in 1 l. of ethanol was shaken for 80 minutes with 162 ml. of 14% sodium carbonate and hydrogenated (80 minutes) in the presence of 2 g. of catalyst. After filtration, concentration to 1 l., and cooling, 26.7 g. (58%) of yellow crystals was obtained. Recrystallization from alcohol gave 14.4 g. (31%) of white crystals, M. P. 199° C., solubility less than 0.01 g. per 100 ml. of water. The overall yield from (I) was 13%, taking into account a 50% recovery of starting acid.

EXAMPLE 14

2-(p-bromophenyl)-quinolyl - 4 - α-piperidylcarbinol (SN 12600)

1.0 mole of each of ethyl 2-(p-bromophenyl)-cinchoninate (M. P. 95° C., from esterification of corresponding acid, M. P. 243° C., which was obtained from p-bromoacetophenone and isatin) and of (Ia) were condensed with 1.35 moles of sodamide in 500 ml. of benzene at 90-100° C. for 32 hours. Hydrolysis required 60 hours refluxing with 1100 ml. of 65% sulfuric acid. The yield of (III) hydrobromide was 226 g., bright yellow solid, equivalent weight 290-310. This was brominated in 77% yield and ring closure and hydrogenation carried out as with SN 10000 except that reduction was very slow and an additional 2 g. of catalyst was added. After reduction, the solution was fitered and concentrated until it became cloudy, then treated with 1 l. of water and allowed to crystallize. Crude (VI) was purified by solution in dilute hydrochloric acid, reprecipitation with alkali, and recrystallization, yield 11 g. (41%), M. P. 199° C., solubility less than 0.01 g. in 100 ml. of water. The overall yield from (I) was 25% taking into account a 50% recovery of starting acid.

EXAMPLE 15

2-(p-diethylaminophenyl)-quinolyl - 4 - α-piperidylcarbinol (SN 11452)

90 g. of ethyl 2 - (p - diethylaminophenyl) - cinchoninate (M. P. 80° C., from esterification of corresponding acid, M. P. 250° C., prepared from aniline, p-diethylaminobenzaldehyde and pyruvic acid) and 68 g. of (Ia) were stirred at 95-100° C. for 33 hours with sodamide from 7.7 g. of sodium. Hydrolysis was complete after 50 hours of refluxing with 400 g. of 50% sulfuric acid. Crude (III) (57 g.) was converted to (III) hydrobromide (57% yield) by means of 48% hydrobromic acid. Bromination in hot hydrobromic acid and addition of isopropanol after cooling gave 70 g. of hygroscopic, relatively unstable (IV) trihydrobromide. This was ring closed in 1500 ml. of ethanol with 15% aqueous sodium carbonate and reduced by shaking for 4 hours with 3 g. of catalyst. Crude (VI) was taken up in chloroform and, after evaporation of solvent, again taken up in acetone and precipitated with acetone-hydrogen chloride, yield 15.7 g. (48% based on (III) hydrobromide), M. P. 175° C., analysis for B·HCl·C₃H₆O. The yellow crystalline free base (VI) crystallized from ethanol as B·C₂H₆O; from isopropanol as B·C₃H₈O, M. P. 99° C.

EXAMPLE 16

*2-(3',4'-dichlorophenyl) - quinolyl-4-α-piperidylcarbinol (SN 11456)*

260 g. (0.75 mole) of ethyl 2-(3',4'- dichlorophenyl)-cinchoninate (M. P. 69° C., from esterification of the corresponding acid, M. P. 257° C., prepared from 3,4-dichloroacetophenone plus isatin), 197 g. of (Ia) and 1.25 moles of sodamide were condensed (36 hours). Hydrolysis with 60% sulfuric acid was continued for 72 hours. Crude (III) plus hydrobromic acid yielded 17.7 g. (14%) hydrobromide, M. P. 246° C. (dec.). This salt was brominated, yielding 21.0 g. of (IV) hydrobromide, M. P. 230° C. (dec.) (unsharp), which was ring closed and reduced (4 hours). Crude (VI) in 80% ethanol plus hydrogen chloride gave 3.5 g. of monohydrochloride which with excess hydrogen chloride was converted to the dihydrochloride, M. P. 234° C., analysis for B·2HCl; melting point of the free base 178° C.

EXAMPLE 17

*(6,8-dichloro-2-(p-chlorophenyl)-quinolyl-4)-α-piperidylcarbinol (SN 11445)*

305.8 g. of ethyl 6,8-dichloro-2-(p-chlorophenyl)-cinchoninate (M. P. 139° C., from the acid, M. P. 261° C., prepared by condensing 5,7-dichloroisatin with p-chloroacetophenone) and 212 g. of (Ia) in 430 ml. of benzene (a paste) was heated with sodamide from 23.3 g. of sodium at about 95° C. for 24 hours. Crude (II) was refluxed for 64 hours with 560 ml. of concentrated sulfuric acid in 660 ml. of water. The solution of crude (III) in chloroform was concentrated to about 500 ml., diluted with about 1 liter of benzene, filtered, and again concentrated. To the residue (264 g.) was added 202 g. of 48% hydrobromic acid and the mixture diluted with acetone. A yellow solid was obtained, yield 124.5 g.; the salt crystallized from 48% hydrobromic acid in clusters of tiny needles, M. P. 259° C. (dec.), analysis for B·HBr; free base corresponding to (III), colorless bars, M. P. 153.5° C., from ethanol-benzene, analysis for C₂₁H₁₇Cl₃N₂. 111.4 g. of (III) hydrobromide in 550 ml. of 48% hydrobromic acid was brominated (in two portions) with a solution of 35.6 g. of bromine. After boiling for 5 minutes, and cooling, (IV) hydrobromide crystallized in clusters of tiny orange needles which were isolated and purified by heating and washing with glacial acetic acid, yield 54.4 g., analysis for B·HBr. 81.5 g. of (IV) hydrobromide in 280 ml. of hot alcohol was treated with 280 ml. of 14% aqueous sodium carbonate, then with 70 g. of solid potassium carbonate and shaken for 1.5 hours. 2.25 g. of catalyst was added and hydrogenation affected (6.5 hours). The product was filtered, washed with hot ethanol and the filtrates concentrated, yielding a crystalline mass which was ground to a powder, triturated with water and dried; it was then stirred with cold ethanol which removed considerable amounts of soluble byproducts, filtered and washed with acetone and with ethanol. The resulting gray powder (18.5 g.) was dissolved in glacial acetic acid, 28 ml. of 12 N hydrochloric acid was added, and the solution diluted with methanol, yield of (VI) hydrochloride 24.8 g., well-formed microneedles, M. P. 250° C., analysis for B·HCl. The free base crystallized from benzene in tiny needles, M. P. 234° C.

EXAMPLE 18

*(2-phenylquinolyl-4)-α-pyrrolidylcarbinol (SN 11169)*

176.8 g. of ethyl 2-phenylcinchoninate and 159.0 g. of ethyl δ-benzamidovalerate in 350 ml. of benzene were heated for 27.5 hours at about 100° C. with sodamide from 18.0 g. of sodium. The product was refluxed for 41 hours with 458 ml. of concentrated hydrochloric acid plus 340 ml. of water. Crude (III), 45.3 g., was dissolved in 50.4 g. of 48% hydrobromic acid; (III) hydrobromide did not crystallize. To this solution was adde 50 ml. of 48% hydrobromic acid and 8.6 g. of bromine in solution, maintaining the temperature at 60° C. On cooling, fluffy needles formed, yield 16.3 g.; a portion was recrystallized from 48% hydrobromic acid, tan needles, M. P. ca. 190° C., analysis for B·2HBr·2.5H₂O. 5.5 g. of (IV) hydrobromide, 150 ml. of ethanol, 23 ml. of 14% sodium carbonate and 5 g. of solid sodium carbonate were shaken for 1 hour and 10 minutes and reduced after addition of catalyst (2.5 hours). After filtering and washing with alcohol, the filtrate was evaporated and the residue taken up in chloroform and this solvent replaced by alcohol. Crude (VI) in 7 ml. of ethanol was treated with 0.8 ml. of 12 N hydrochloric acid; clusters of prisms formed, yield 1.5 g. which was recrystallized from ethanol-methanol containing a small amount of concentrated hydrochloric acid, rectangular bars, M. P. 221° C. (dec.), analysis for B·2HCl·H₂O. The free base crystallized from isopropanol in fine needles containing one molecule of solvent, M. P. 89° C.

*Antimalarial properties of typical compounds*

In order to illustrate the effect of various substituents on the antimalarial potency of the parent carbinols from which the compounds of the present invention may be regarded as being derived, the quinine equivalents (Q) of representative compounds, calculated on the basis of comparative tests against *P. lophurae* in the duck, are presented in the table. To afford a basis of comparison, the Q value of the "naked Ainley-King nucleus" (G; Code Number 2549), which may be regarded as the parent substance of this class of compounds as well as that of the most active compound (A; Code Number 2157) reported by Ainley and King, are also given in this table. The general formula and the numbering system of the compounds listed in this table are as follows:

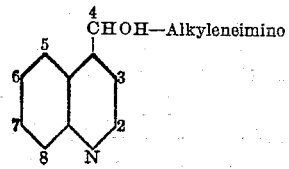

TABLE

*Effect of 2-aryl substitution, with or without supplementary substitution, on the antimalarial activity of certain quinolyl-4-carbinols*

| Remarks | Code No. | Nuclear Substituent; Quinolyl Group | Alkyleneimino Group | Quinine Equivalent (Q) |
|---|---|---|---|---|
| "Naked" A-K nucl., Best A-K Comp. | 2549 | None | 2-piperidyl | 0.08 |
| | 2157 | 6-Methoxy | Same | 0.3 |
| | 11169 | 2-phenyl | 2-pyrrolidyl | 1 |
| | 8538 | ....do | 2-piperidyl | 3 |
| | 10000 | 2-(p-chlorophenyl) | Same | 15 |
| | 11456 | 2-(3,4-dichlorophenyl) | Same | 10 |
| | 12600 | 2-(p-bromophenyl) | Same | 8 |
| | 11449 | 2-p-tolyl | Same | 1 |
| | 11451 | 2-(p-methoxyphenyl) | Same | 2 |
| | 11452 | 2-(p-diethylaminophenyl) | Same | 1 |
| 2-Aryl Substitution, With or Without Supplementary Substitutions | 9848 | 2-phenyl, 6-chloro | 2-piperidyl | 4 |
| | 11370 | ....do | 1-methyl-2-piperidyl | 4 |
| | 10286 | 2-phenyl, 7-chloro | 2-piperidyl | 10 |
| | 10281 | 2-phenyl, 8-chloro | Same | 20 |
| | 10282 | 2-phenyl, 6,7-dichloro | Same | 20 |
| | 10275 | 2-phenyl, 6,8-dichloro | Same | 20 |
| | 12895 | 2-(p-chlorophenyl), benzo [h] | Same | 8 |
| | 11445 | 2-(p-chlorophenyl), 6,8-dichloro. | Same | 40 |
| | 9875 | 2-phenyl, 6-methyl | Same | 3 |
| | 12238 | 2-phenyl, 8-methyl | Same | 8 |
| | 9849 | 2-phenyl, 6-methoxy | Same | 2 |
| | 12239 | 2,8-diphenyl | Same | 1 |
| | 10534 | 2-phenylbenzo [h] | Same | 10 |
| Miscellaneous 2-Substitutions Other Than 2-Aryl | 11444 | 2-styryl | 2-piperidyl | 1 |
| | 10528 | 2-phenethyl | Same | <0.3 |
| | 10956 | 2-methyl, 6-methoxy | Same | 1.5 |
| | 10001 | 2-(1-piperidyl) | Same | 0.6 |
| | 13087 | 2-dibutylamino | Same | 1.5 |
| | 10002 | 2-(4-morpholinyl) | Same | 1 |
| | 12089 | 2-hydroxy | Same | <0.06 |
| | 10748 | 2-isopropyl | Same | <0.3 |
| | 10749 | 2-cyclohexyl | Same | 0.15 |

From these data it will be apparent that, in this series of compounds, on the basis of tests against *P. lophurae* in the duck, the following general conclusions may be drawn: (1) that the substitution of an aryl group in the 2-position of the quinoline nucleus, even without further substitution, generally increases the activity of the parent substance by a factor of from about 10 to about 150; and (2) that the substitution of (*a*) an aryl group in the 2-position of the quinoline nucleus, plus (*b*) the additional substitution of groups such as halogen, alkyl, benzo, etc., in the 6, 7 and/or 8 position of the same ring generally increases the activity of the parent substance by a factor of from about 10 to about 400.

*Clinical experience.*—Of the drugs summarized in the table, the following have received trial for their effectiveness in human malaria:

SN 2549    SN 10275
SN 2157    SN 9849
SN 8538

The clinical study of these compounds has demonstrated a rough parallel between antimalarial activity in the avian infections and antimalarial activity in human vivax malaria. More specifically, it has substantiated the finding in certain of the avian infections that 2-phenyl substituted compounds of this general type are more active than their analogs in the absence of such a substituent and that the addition of halogen substituents on the benzene portion of the quinoline nucleus retains or enhances this increased antimalarial activity.

With reference to the question of nomenclature, it should be pointed out that for the purpose of the present invention, the various fused ring systems containing the parent quinoline component or skeleton to which another ring system is fused, are regarded as "substituted quinoline compounds." Thus, for example, the various benzoquinolines are considered members of the parent quinoline class of compounds; i. e., they merely represent special instances of substitution in the parent quinoline skeletal system.

In the foregoing specification, we have set forth not only the general principles involved but also a large number of specific examples of preferred embodiments of the present invention. From the type and number of the illustrative examples given, it will be readily apparent to those skilled in the art that a great many variations, modifications and extensions of the principles involved may be made without departing from the spirit and scope of the invention. All such variations, modifications and extensions are therefore to be understood as embraced within the scope of the appended patent claim.

Having thus described our invention, what we claim as new and wish to secure by Letters Patent is:

A new carbinol having the general structural formula:

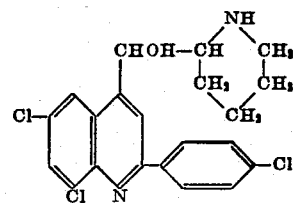

JOSEPH B. KOEPFLI.
EDWIN R. BUCHMAN.

(References on following page)

REFERENCES CITED

The following references are of record in the file of this patent:

UNITED STATES PATENTS

| Number | Name | Date |
|---|---|---|
| 1,434,306 | Miescher | Oct. 31, 1922 |
| 1,891,980 | Hartmann et al. | Dec. 27, 1932 |

FOREIGN PATENTS

| Number | Country | Date |
|---|---|---|
| 92,608 | Switzerland | Jan. 16, 1922 |
| 98,713 | Switzerland | Apr. 16, 1923 |

OTHER REFERENCES

King et al.: J. Chem. Soc. (London), 1940, pp. 1307–1315.

May et al.: J. Org. Chem., vol. 11, pp. 1–9 (1946).